US012798702B2

(12) United States Patent
Lee et al.

(10) Patent No.: US 12,798,702 B2
(45) Date of Patent: Nov. 17, 2026

(54) PRINTING APPARATUS

(71) Applicants: Hyundai Motor Company, Seoul (KR); Kia Corporation, Seoul (KR); Base and Power City Corp., Seoul (KR)

(72) Inventors: Donguk Lee, Seoul (KR); Sungsu Park, Seoul (KR)

(73) Assignees: Hyundai Motor Company, Seoul (KR); Kia Corporation, Seoul (KR); Base and Power City Corp., Seoul (KR)

(*) Notice: Subject to any disclaimer, the term of this patent is extended or adjusted under 35 U.S.C. 154(b) by 279 days.

(21) Appl. No.: 18/640,306

(22) Filed: Apr. 19, 2024

(65) Prior Publication Data

US 2025/0171094 A1 May 29, 2025

(30) Foreign Application Priority Data

Nov. 28, 2023 (KR) ........................ 10-2023-0168432

(51) Int. Cl.

| | |
|---|---|
| ***B29C 64/245*** | (2017.01) |
| ***B25J 11/00*** | (2006.01) |
| ***B25J 15/00*** | (2006.01) |
| ***B62D 57/02*** | (2006.01) |
| *B25J 5/00* | (2006.01) |
| *B62D 57/032* | (2006.01) |

(52) U.S. Cl.

CPC ............. *B62D 57/02* (2013.01); *B25J 11/005* (2013.01); *B25J 15/0019* (2013.01); *B29C 64/245* (2017.08); *B25J 5/00* (2013.01); *B62D 57/032* (2013.01)

(58) Field of Classification Search

CPC .... B62D 57/02; B62D 57/032; B29C 64/245; B25J 11/005; B25J 15/0019; B25J 5/00

See application file for complete search history.

(56) References Cited

U.S. PATENT DOCUMENTS

2023/0120878 A1 4/2023 Zhou et al.

FOREIGN PATENT DOCUMENTS

| | | | | |
|---|---|---|---|---|
| KR | 20140005463 U | 10/2014 | | |
| KR | 101706473 B1 | 2/2017 | | |
| KR | 20200101482 A | 8/2020 | | |
| KR | 102278253 B1 | 7/2021 | | |
| KR | 20230022067 A | 2/2023 | | |
| WO | WO-2021108936 A1 | * | 6/2021 | ........... B62D 57/032 |
| WO | WO-2022117845 A1 | * | 6/2022 | ............ B25J 19/005 |
| WO | 2023031302 A1 | 3/2023 | | |

* cited by examiner

*Primary Examiner* — William C Joyce

(74) *Attorney, Agent, or Firm* — Slater Matsil, LLP

(57) ABSTRACT

A printing apparatus including a movable robot that is to be movable on the ground, a printing part mounted on the movable robot and that performs three-dimensional (3D) printing, and leg parts configured to be movable to the ground to fix a position of the movable robot with respect to the ground.

20 Claims, 8 Drawing Sheets

PRINTING APPARATUS

CROSS-REFERENCE TO RELATED APPLICATIONS

This application claims the benefit of priority to Korean Patent Application No. 10-2023-0168432, filed in the Korean Intellectual Property Office on Nov. 28, 2023, the entire contents of which are incorporated herein by reference.

TECHNICAL FIELD

The present disclosure relates to a printing apparatus.

BACKGROUND

Three-dimensional (3D) printing means an activity of three-dimensionalizing electronic information for implementing a 3D shape through an automated output device. With development of technology related to the 3D printing, research on architectural technologies using 3D printing technology is currently and actively conducted.

A 3D printer according to the related art adopts a fixed method of printing a product in a state in which a frame is fixed to the ground. That is, a product is printed inside a work area of equipment, and thus when a large structure is produced, a 3D printer having a large work area is required to have a work area corresponding to a size of the structure.

Further, an environment in which construction is progressed may be a harsh environment or an environment that is difficult for a person to approach, such as a narrow space for the person to pass therethrough. In the case of the 3D printer according to the related art, it is very difficult to move the 3D printer to this environment.

Thus, there is a need for development of the 3D printer that may move to a construction-progressed environment, may produce a product based on the movement, and thus does not require a large work area.

SUMMARY

The present disclosure relates to a printing apparatus. Some embodiments of the present disclosure can solve the above-mentioned problems occurring in the prior art while advantages achieved by the prior art are maintained intact.

An embodiment of the present disclosure can provide a printing apparatus that may be applied to various environmental conditions.

An embodiment of the present disclosure can provide a printing apparatus that may produce a large structure despite having a relatively small work area.

Technical problems to be solved by some embodiments of the present disclosure are not limited to the aforementioned problems, and other technical problems not mentioned herein can be solved by an embodiment, which can be understood from the following description by those skilled in the art to which the present disclosure pertains.

According to an embodiment of the present disclosure, a printing apparatus can include a movable robot that is movable on a ground, a printing part that is connected to the movable robot and performs three-dimensional (3D) printing, and a plurality of leg parts that fix a position of the movable robot with respect to the ground, and the plurality of leg parts are movable such that one end thereof approach the ground or move away from the ground.

The printing apparatus may further include a connection part between the movable robot and the printing part based on a vertical direction and connecting the movable robot and the printing part, and the plurality of leg parts may be mounted on the connection part such that the leg parts are spaced apart from each other in a circumferential direction of the connection part that is a direction intersecting the vertical direction.

Each of the plurality of leg parts may include a fixed area having a shape of which one end is fixed to a circumferential surface of the connection part and the other end protrudes to one side in a horizontal direction with respect to the connection part.

Each of the plurality of leg parts further may include a rotation area of which one end is connected to the other end of the fixed area to be rotatable about a leg rotation axis, and the leg rotation axis may extend in a direction intersecting the vertical direction.

A storage groove can have a shape that extends to the one side in the horizontal direction such that the rotation area is accommodated therein and is recessed downward may be formed at an upper portion of the fixed area, and the storage groove may have a shape of which the one side in the horizontal direction is open and a side opposite to the one side in the horizontal direction is closed.

Each of the plurality of leg parts may further include a telescopic area that is accommodated inside the rotation area or extracted from the inside of the rotation area in an extension direction that is a direction in which the rotation area extends.

The telescopic area may include a first telescopic area that is movable in the extension direction with respect to the rotation area such that the first telescopic area is accommodated inside the rotation area or extracted from the inside of the rotation area, and a second telescopic area that is movable in the extension direction with respect to the first telescopic area such that the second telescopic area is accommodated inside the first telescopic area or extracted from the inside of the first telescopic area.

When an upper portion of the printing apparatus is viewed in a direction parallel to the vertical direction, the other end of the fixed area may be configured to be spaced apart from the one side in the horizontal direction with respect to the movable robot.

The plurality of leg parts may include a first leg part mounted on a side of a peripheral surface of the connection part in a first horizontal direction, and a second leg part mounted on a side of the peripheral surface of the connection part in a second horizontal direction opposite to the first horizontal direction, the fixed area may include a first fixed area that is provided in the first leg part and of which one end is fixed to the side of the peripheral surface of the connection part in the first horizontal direction, and a second fixed area that is provided in the second leg part and of which one end is fixed to the side of the peripheral surface in the second horizontal direction, and when an upper portion of the printing apparatus is viewed in a direction parallel to the vertical direction, the other end of the first fixed area and the other end of the second fixed area may be spaced apart from each other in the first horizontal direction with the movable robot interposed therebetween.

The plurality of leg parts may further include a third leg part mounted on a side of the peripheral surface of the connection part in a third horizontal direction, and a fourth leg part mounted on a side of the peripheral surface of the connection part in a fourth horizontal direction opposite to the third horizontal direction, the plurality of fixed areas may further include a third fixed area that is provided in the third leg part and of which one end is fixed to the side of the peripheral surface of the connection part in the third horizontal direction, and a fourth fixed area that is provided in the fourth leg part and of which one end is fixed to the side of the peripheral surface in the fourth horizontal direction, and when the upper portion of the printing apparatus is viewed in the direction parallel to the vertical direction, the other end of the third fixed area and the other end of the fourth fixed area may be spaced apart from each other in the third horizontal direction with the movable robot interposed therebetween.

The first horizontal direction and the second horizontal direction may intersect the third horizontal direction and the fourth horizontal direction.

The printing apparatus may further include a supply part that is on a rear side of an upper portion of the movable robot and supplies a material to the printing part, and the printing part may include a discharge member that is connected to the supply part and discharges the material, and a multi-joint robot that is on a front side of the upper portion of the movable robot and moves the discharge member to a target position.

The multi-joint robot may include a plurality of links forming different rotation axes and being rotatable with respect to each other, and the plurality of links may include a telescopic link that forms a telescopic rotation axis and of which a length in a direction in which the telescopic rotation axis extends increases or decreases.

The supply part may include a storage member that stores the material, and a hose member that is inserted through an upper portion of the storage member in a vertical direction, extrudes the material thereinto, and supplies the material to the discharge member.

The printing apparatus may further include an information acquisition part that is mounted on the movable robot and acquires terrain information around the printing apparatus, and a controller electrically connected to at least one of the movable robot, the printing part, and the plurality of leg parts, and the controller may calculate leg heights that are heights of the plurality of leg parts with respect to the ground, based on the terrain information, and control the plurality of leg parts such that the plurality of leg parts are in close contact with the ground based on the calculated leg heights when the movable robot reaches at a target point for the printing part to perform the 3D printing.

The information acquisition part may include a light detection and ranging (LiDAR) sensor.

BRIEF DESCRIPTION OF THE DRAWINGS

The above and other features and advantages of the present disclosure can be more apparent from the following detailed description taken in conjunction with the accompanying drawings, in which.

DETAILED DESCRIPTION OF ILLUSTRATIVE EMBODIMENTS

Figure 1:
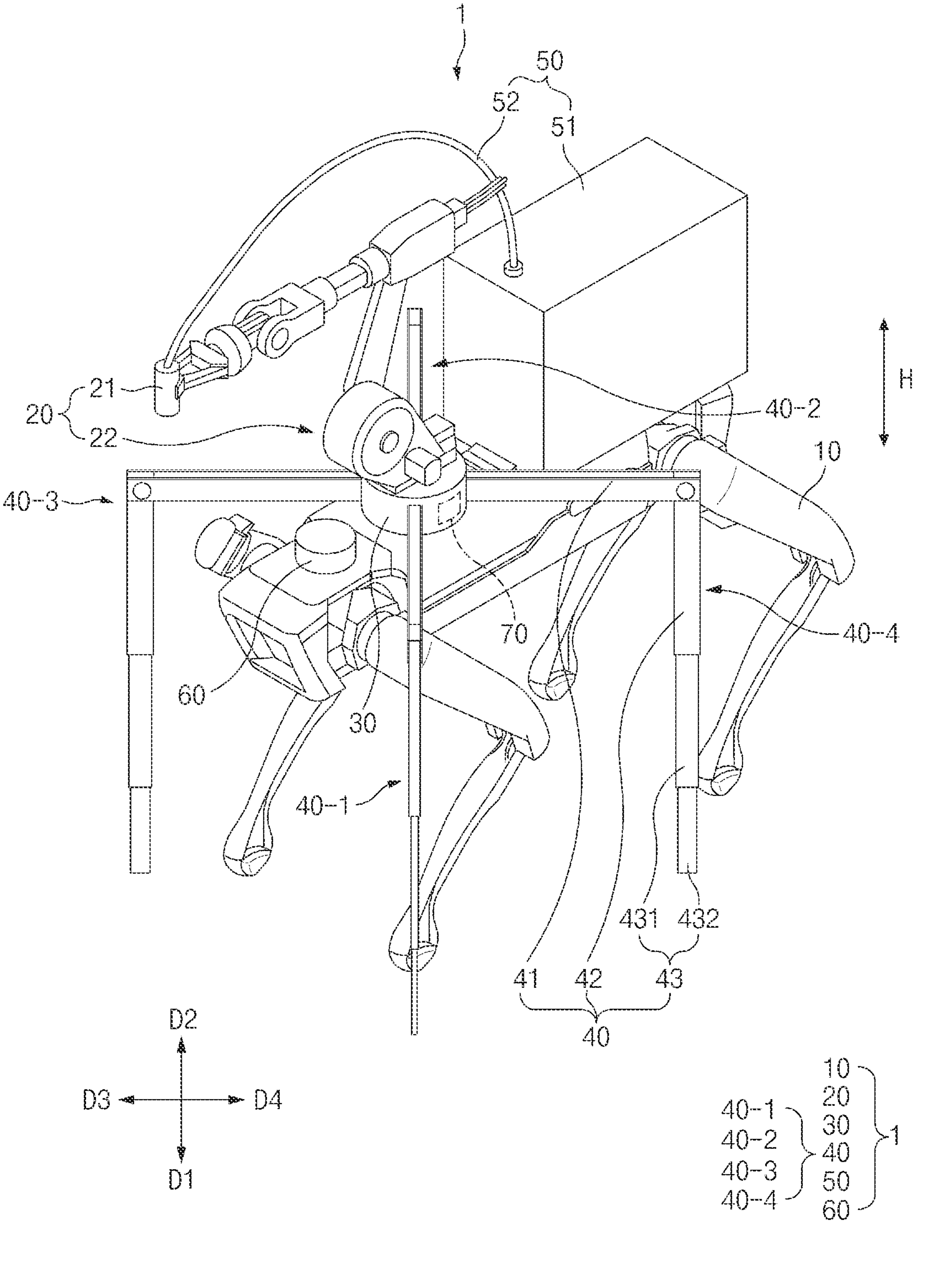
FIG. 1 is a perspective view of a printing apparatus according to an embodiment of the present disclosure.

Hereinafter, some example embodiments of the present disclosure will be described in detail with reference to the drawings. In adding reference numerals to components of each drawing, it can be noted that identical or equivalent components can be designated by an identical numeral even when they are displayed on other drawings. Further, in describing the example embodiments of the present disclosure, a detailed description of the related known configuration or function can be omitted when it is determined that it interferes with the understanding of the embodiment of the present disclosure.

Hereinafter, a printing apparatus 1 according to an example embodiment of the present disclosure will be described with reference to the accompanying drawings.

FIG. 1 is a perspective view of a printing apparatus according to an embodiment of the present disclosure.

Referring to FIG. 1, the printing apparatus 1 according to the embodiment of the present disclosure may be a printing system for three-dimensional (3D) printing. For example, the printing apparatus 1 may perform the 3D printing that produces a structure for use at a construction site. The printing apparatus 1 may include a movable robot 10, a printing part 20, a connection part 30, a leg part 40, a supply part 50, an information acquisition part 60, and a controller 70, any combination of or all of which may be in plural or may include plural components thereof.

The movable robot 10 may be provided to be movable on the ground. For example, the movable robot 10 may be a robot capable of a four-leg walk, which moves on the ground through movement of four legs.

The printing part 20 may perform the 3D printing. The printing part 20 may be mounted on the movable robot 10. For example, the printing part 20 may be mounted on an upper portion of a body of the movable robot 10. The printing part 20 may include a discharge member 21 and a multi-joint robot 22.

The discharge member 21 may discharge a material for the 3D printing. The discharge member 21 may be mounted on one end of the multi-joint robot 22. The discharge member 21 may move to a target position by movement of the multi-joint robot 22.

Figure 2:
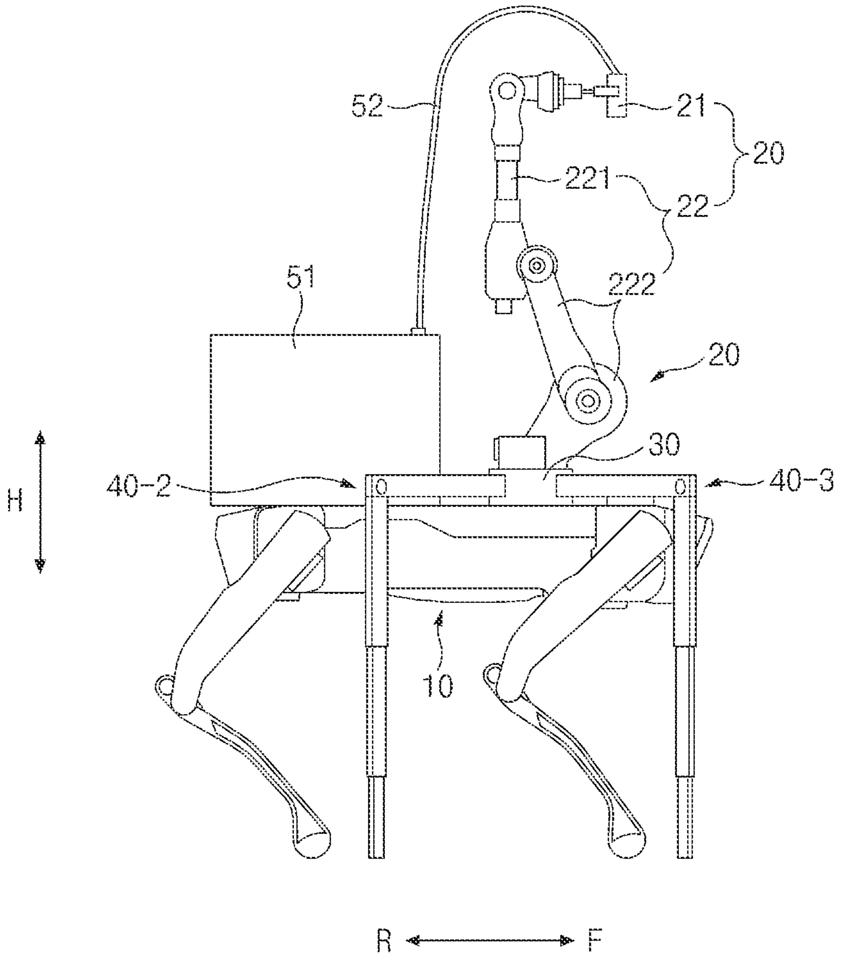
FIG. 2 is a side view of the printing apparatus according to an embodiment of the present disclosure.
Figure 3:
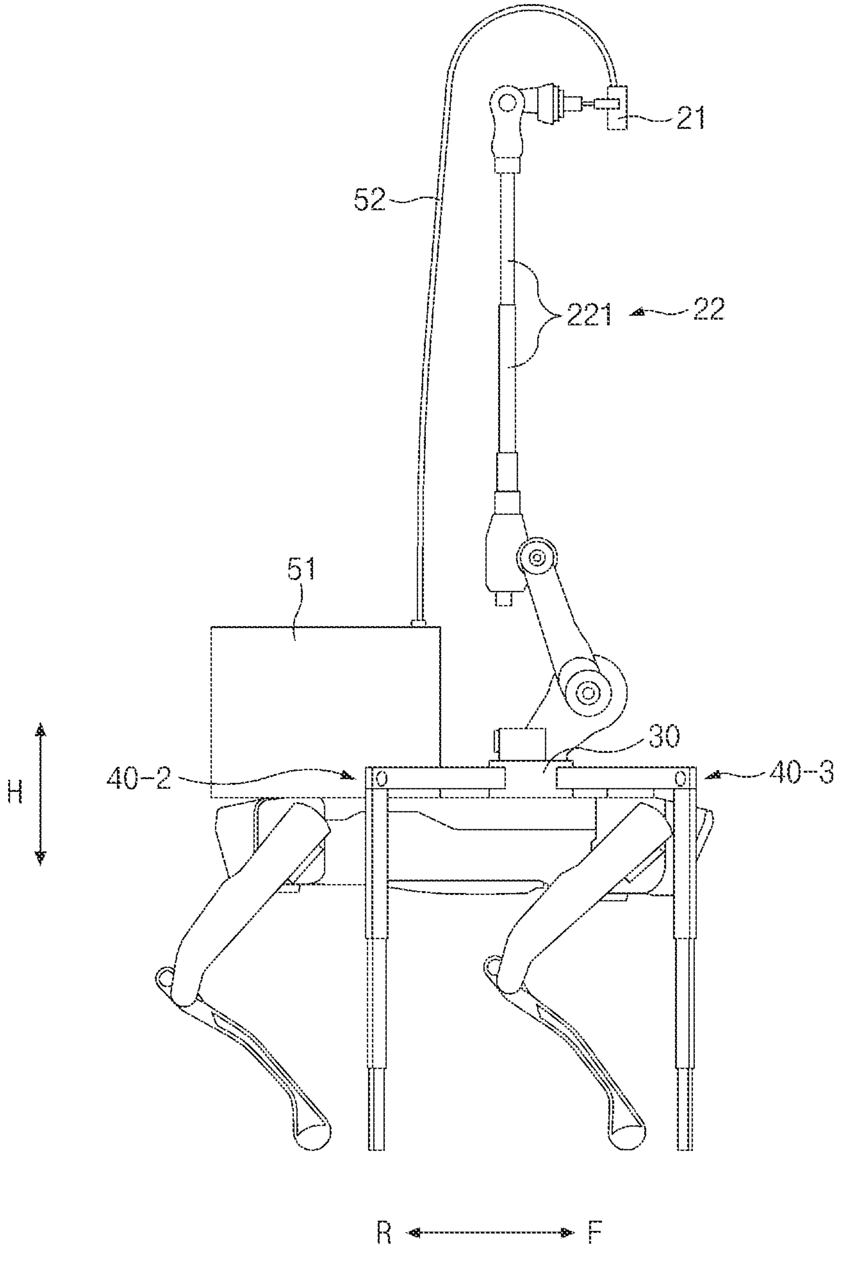
FIG. 3 is a side view of the printing apparatus according to an embodiment of the present disclosure, illustrating a state in which a telescopic link of FIG. 2 is elongated in a vertical direction.

FIG. 2 is a side view of the printing apparatus according to an embodiment of the present disclosure, and FIG. 3 is a view illustrating a state in which a telescopic link of FIG. 2 is elongated in a vertical direction.

Referring further to FIGS. 2 and 3, a plurality of joints may be formed in the multi-joint robot 22. The multi-joint robot 22 may include a plurality of links rotatably connected to each other. For example, the plurality of joints may be a plurality of portions in which the plurality of links are connected to each other. One end of the multi-joint robot 22 may be mounted on an upper portion of the connection part 30, and the other end of the multi-joint robot 22 may be mounted on the discharge member 21. The multi-joint robot 22 may include a telescopic link 221 and a plurality of joint links 222.

The telescopic link 221 may have a telescopic structure that may be moved such that a distance between both ends becomes longer or shorter. The telescopic link 221 may form a predetermined rotation axis (telescopic rotation axis). Both ends of the telescopic link 221 may move away from each other or closer to each other in a direction of the telescopic rotation axis.

For example, the telescopic link 221 may include a plurality of shafts, one of which may be accommodated in the other one thereof. As a detailed example, the telescopic link 221 may include a first shaft, a second shaft, and a third shaft. The first shaft may be rotatably connected to one end of any one of the plurality of joint links 222. The second shaft may be accommodated inside the first shaft or extracted from the inside of the first shaft. The third shaft may be accommodated inside the second shaft or extracted from the inside of the second shaft. Further, the third shaft may be rotatably connected to one end of the other one of the plurality of joint links 222. The other one of the plurality of joint links 222 may be a joint link that is different from the joint link connected to the first shaft.

The telescopic link 221 is not limited to including only the three shafts (e.g., the first shaft, the second shaft, and the third shaft) and may include two shafts or four or more shafts.

The plurality of joint links 222 may form the plurality of joints of the multi-joint robot 22. The plurality of joints may be formed by ends of the plurality of joint links 222, respectively. The plurality of joints may form a plurality of different rotation axes. As an example, the plurality of rotation axes may be provided as six rotation axes. As a detailed example, five joint links 222 may be provided, and one telescopic link 221 may be provided. Further, the six links may be rotatable about the six rotation axes, respectively. For example, the joint links 222 connected to both ends of the telescopic link 221 may be rotatable about the telescopic rotation axis. The multi-joint robot 22 is not limited to the example and may be provided with five or less or seven or more rotation axes and links.

The connection part 30 may connect the movable robot 10 and the multi-joint robot 22. For example, the multi-joint robot 22 may be connected to an upper portion of the connection part 30, and the movable robot 10 may be connected to a lower portion of the connection part 30. In other words, the connection part 30 may be between the movable robot 10 and the multi-joint robot 22 based on a vertical direction "H." As an example, the connection part 30 may have a cylindrical shape.

The connection part 30 may be on a front side "F" of an upper surface of the movable robot 10. Further, the connection part 30 may be on the front side "F" of the supply part 50. For example, the supply part 50 may be on a rear side "R" of the upper surface of the movable robot 10.

The leg part 40 may fix a position of the movable robot 10 with respect to the ground. The leg part 40 may be mounted on a peripheral surface of the connection part 30. The peripheral surface of the connection part 30 may be an outer surface of the connection part 30 positioned between an upper end and a lower end of the connection part 30 having a cylindrical shape.

Further, the leg part 40 may be movable to move closer to or away from the ground. The leg part 40 may include a fixed area 41, a rotation area 42, and a telescopic area 43.

The fixed area 41 may be fixed to the peripheral surface of the connection part 30. The fixed area 41 may have a shape that protrudes from the peripheral surface of the connection part 30 to one side in a horizontal direction. One end of the fixed area 41 may be connected to the peripheral surface of the connection part 30. Further, when an upper portion of the printing apparatus 1 is viewed in a direction parallel to the vertical direction "H," the other end of the fixed area 41 (an end opposite to the one end of the fixed area 41) may be configured to be spaced apart from the one side in the horizontal direction with respect to the movable robot.

Figure 4:
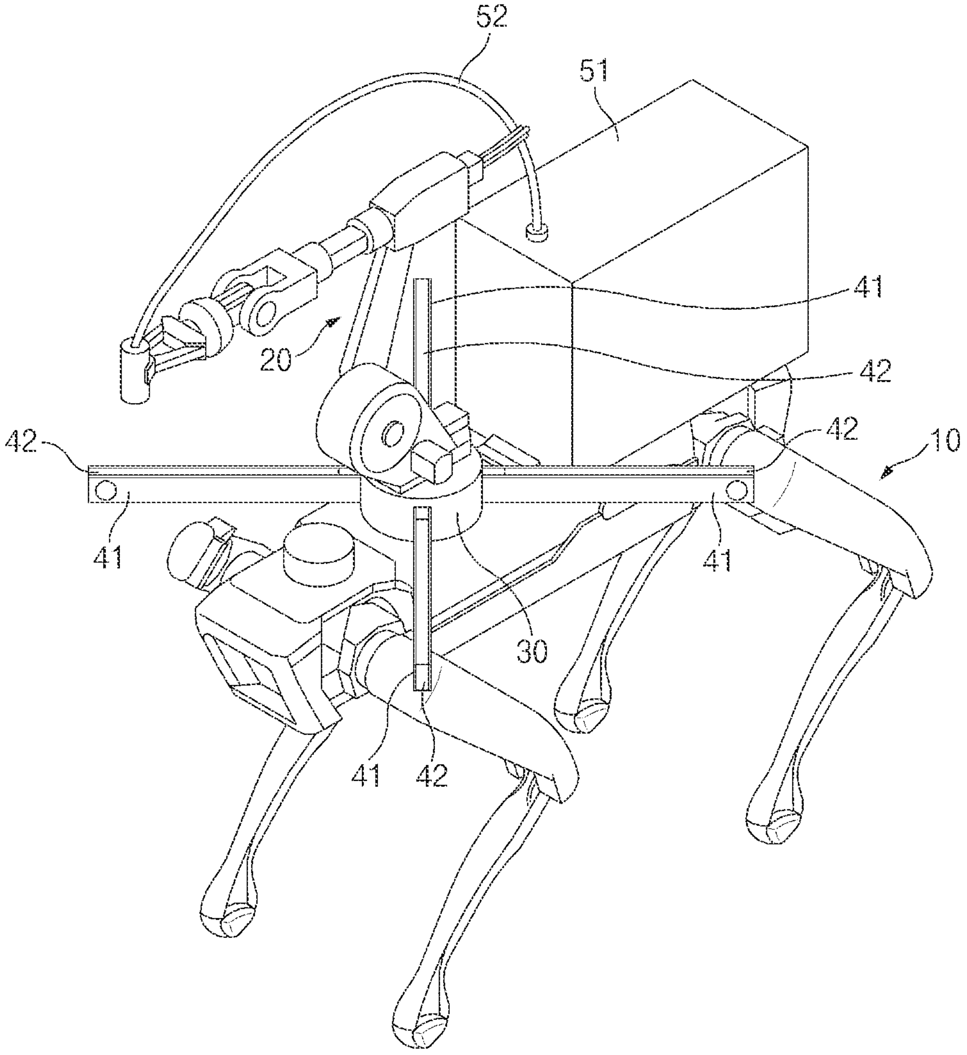
FIG. 4 is a view illustrating a state in which a rotation area is accommodated in a storage groove according to an embodiment of the present disclosure.
Figure 5:
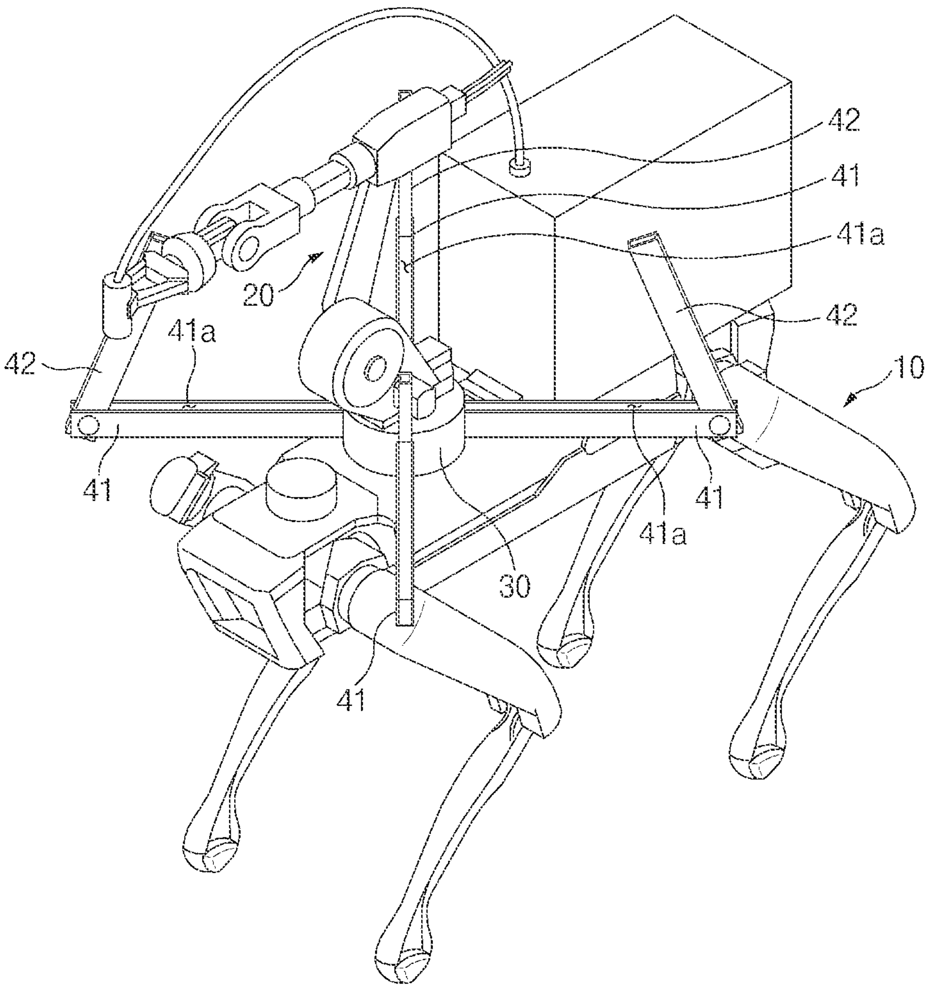
FIG. 5 is a view illustrating a state in which the rotation area is extracted from the storage groove according to an embodiment of the present disclosure.

FIG. 4 is a view illustrating a state in which a rotation area is accommodated in a storage groove according to an embodiment of the present disclosure. FIG. 5 is a view illustrating a state in which the rotation area is extracted from the storage groove according to an embodiment of the present disclosure.

Referring further to FIGS. 4 and 5, a storage groove **41*a* may be formed in the fixed area 41. The storage groove 41*a* may be a groove having a shape recessed downward at an upper portion of the fixed area 41. The storage groove 41*a*** may extend to one side in the horizontal direction.

The storage groove **41*a* may have a shape in which one side of the storage groove 41*a* in the horizontal direction is open and the other side of the storage groove 41*a* in the horizontal direction (a side opposite to the one side in the horizontal direction) is closed. For example, the one side in the horizontal direction may be a direction in which the connection part 30 faces a center of the fixed area 41, and the other side in the horizontal direction may be a direction in which the center of the fixed area 41 faces the connection part 30**.

The rotation area 42 may be connected to the fixed area 41 to be rotatable about a leg rotation axis. The leg rotation axis may extend in a direction intersecting the vertical direction "H." For example, the leg rotation axis may be perpendicular to the vertical direction "H" and a direction in which the storage groove **41*a*** extends.

One end of the rotation area 42 may be rotatably connected to the one end of the fixed area 41 in the horizontal direction (the other end of the fixed area 41). As described above, as the other end of the fixed area 41 is spaced apart from one side of the movable robot 10 in the horizontal direction, the rotation area 42 and the movable robot 10 can be prevented from interfering with each other while the rotation area 42 rotates about the other end of the fixed area 41.

An accommodation groove for accommodating the telescopic area 43 may be formed inside the rotation area 42. The accommodation groove may extend in a direction in which the rotation area 42 extends (e.g., an extension direction).

Referring back to FIG. 1, the telescopic area 43 may be accommodated inside the rotation area 42 or extracted from the inside of the rotation area 42 in the extension direction. The telescopic area 43 may have a structure similar to that of the telescopic link 221. The telescopic area 43 may include a first telescopic area 431 and a second telescopic area 432.

The first telescopic area 431 may move in the extension direction with respect to the rotation area 42 such that the first telescopic area 431 can be accommodated inside the rotation area 42 or extracted from the inside of the rotation area 42. For example, the first telescopic area 431 and the rotation area 42 may have a cylinder-piston relationship. As a detailed example, the rotation area 42 may serve as a cylinder, and the first telescopic area 431 may serve as a piston.

The second telescopic area 432 may move in the extension direction with respect to the first telescopic area 431 such that the second telescopic area 432 is accommodated inside the first telescopic area 431 or extracted from the inside of the first telescopic area 431. For example, the second telescopic area 432 and the first telescopic area 431 may have a cylinder-piston relationship. As a detailed example, the first telescopic area 431 may serve as a cylinder, and the second telescopic area 432 may serve as a piston.

Further, the leg part 40 may be provided as a plurality of leg parts 40. The plurality of leg parts 40 may be spaced apart from each other in a peripheral direction of the connection part 30. The peripheral direction may be a direction which intersects (e.g., which is perpendicular to) the vertical direction “H” and in which the leg parts 40 rotate about a rotation shaft extending in the vertical direction “H.”

Referring to FIG. 1, the plurality of leg parts 40 may include a first leg part 40-1, a second leg part 40-2, a third leg part 40-3, and a fourth leg part 40-4. The first leg part 40-1 may be mounted on a side of the peripheral surface of the connection part 30 in a first horizontal direction D1. The first leg part 40-1 may have a shape protruding from the peripheral surface of the connection part 30 in the first horizontal direction D1. The first horizontal direction D1 may be one direction that intersects (e.g., which is perpendicular to) the vertical direction “H” among the horizontal directions. For example, the first horizontal direction D1 may be a direction toward a left front side of the printing apparatus 1.

The fixed area 41, the rotation area 42, and the telescopic area 43 provided in the first leg part 40-1 may be named a first fixed area, a first rotation area, and a first telescopic area, respectively.

The second leg part 40-2 may be mounted on a side of the peripheral surface of the connection part 30 in a second horizontal direction D2. The second leg part 40-2 may have a shape protruding from the peripheral surface of the connection part 30 in the second horizontal direction D2. The second horizontal direction D2 may be opposite to the first horizontal direction D1. For example, the second horizontal direction D2 may be a direction toward a right rear side of the printing apparatus 1.

The fixed area 41, the rotation area 42, and the telescopic area 43 provided in the second leg part 40-2 may be named a second fixed area, a second rotation area, and a second telescopic area.

For example, the other end of the first fixed area (e.g., an end of the first fixed area in the first horizontal direction D1) and the other end of the second fixed area (e.g., an end of the second fixed area in the second horizontal direction D2) may be spaced apart from each other in a direction parallel to the first horizontal direction D1 with the movable robot 10 interposed therebetween.

The third leg part 40-3 may be mounted on a side of the peripheral surface of the connection part 30 in a third horizontal direction D3. The third leg part 40-3 may have a shape protruding from the peripheral surface of the connection part 30 in the third horizontal direction D3. The third horizontal direction D3 may be one direction which intersects (e.g., which is perpendicular to) the vertical direction “H” and the first horizontal direction D1 among the horizontal directions. For example, the third horizontal direction D3 may be a direction toward a right front side of the printing apparatus 1.

The fixed area 41, the rotation area 42, and the telescopic area 43 provided in the third leg part 40-3 may be named a third fixed area, a third rotation area, and a third telescopic area.

The fourth leg part 40-4 may be mounted on a side of the peripheral surface of the connection part 30 in a fourth horizontal direction D4. The fourth leg part 40-4 may have a shape protruding from the peripheral surface of the connection part 30 in the fourth horizontal direction D4. The fourth horizontal direction D4 may be opposite to the third horizontal direction D3. For example, the fourth horizontal direction D4 may be a direction toward a left rear side of the printing apparatus 1.

The fixed area 41, the rotation area 42, and the telescopic area 43 provided in the fourth leg part 40-4 may be named a fourth fixed area, a fourth rotation area, and a fourth telescopic area.

For example, the other end of the third fixed area (e.g., an end of the third fixed area in the third horizontal direction D3) and the other end of the fourth fixed area (e.g., an end of the fourth fixed area in the fourth horizontal direction D4) may be spaced apart from each other in a direction parallel to the third horizontal direction D3 with the movable robot 10 interposed therebetween.

The supply part 50 may include a storage member 51 and a hose member 52. The storage member 51 may store a material therein. Further, the storage member 51 may extrude the material into the hose member 52 and supply the material to the discharge member 21. The storage member 51 may be on an upper rear side of the movable robot 10. The storage member 51 may be a rectangular parallelepiped-shaped tank in which the material may be accommodated.

The hose member 52 may connect the storage member 51 and the discharge member 21. A passage through which a 3D printing material flows may be formed inside the hose member 52.

The information acquisition part 60 may acquire terrain information around the printing apparatus 1. For example, the information acquisition part 60 may include a LiDAR sensor. The information acquisition part 60 may be mounted on an upper portion of the movable robot 10. For example, the information acquisition part 60 may be in front of the connection part 30.

The controller 70 may be electrically connected to at least one of the movable robot 10, the printing part 20, the leg part 40, the supply part 50, and the information acquisition part 60. The controller 70 may control the movable robot 10, the printing part 20, the leg part 40, and the supply part 50 based on the information acquired by the information acquisition part 60.

The controller 70 may control the movable robot 10 so that the printing part 20 moves to a printing target point that is a target point for performing the 3D printing. The controller 70 may control the movable robot 10 so that, when the movable robot 10 reaches the printing target point, the movable robot 10 no longer moves and the movable robot 10 is placed in a stationary state.

The controller 70 may calculate leg heights that are heights of the plurality of leg parts 40 with respect to the ground, based on the terrain information acquired by the information acquisition part 60 when the movable robot 10 is in a stationary state. For example, a leg height (e.g., a first leg height) of the first leg part 40-1 may be defined as a separation distance between the first fixed area and the ground in the vertical direction "H," a leg height (e.g., a second leg height) of the second leg part 40-2 may be defined as a separation distance between the second fixed area and the ground in the vertical direction "H," a leg height (e.g., a third leg height) of the third leg part 40-3 may be defined as a separation distance between the third fixed area and the ground in the vertical direction "H," and a leg height (e.g., a fourth leg height) of the fourth leg part 40-4 may be defined as a separation distance between the fourth fixed area and the ground in the vertical direction "H." For example, when a curve (e.g., unevenness) is formed in a terrain of the ground which the movable robot 10 reaches, at least two of the first leg height, the second leg height, the third leg height, and the fourth leg height may be different from each other.

When the movable robot 10 reaches the printing target point, the controller 70 may control the plurality of leg parts 40 so that the plurality of leg parts 40 come in contact with the ground, based on the calculated leg heights.

Figure 7:
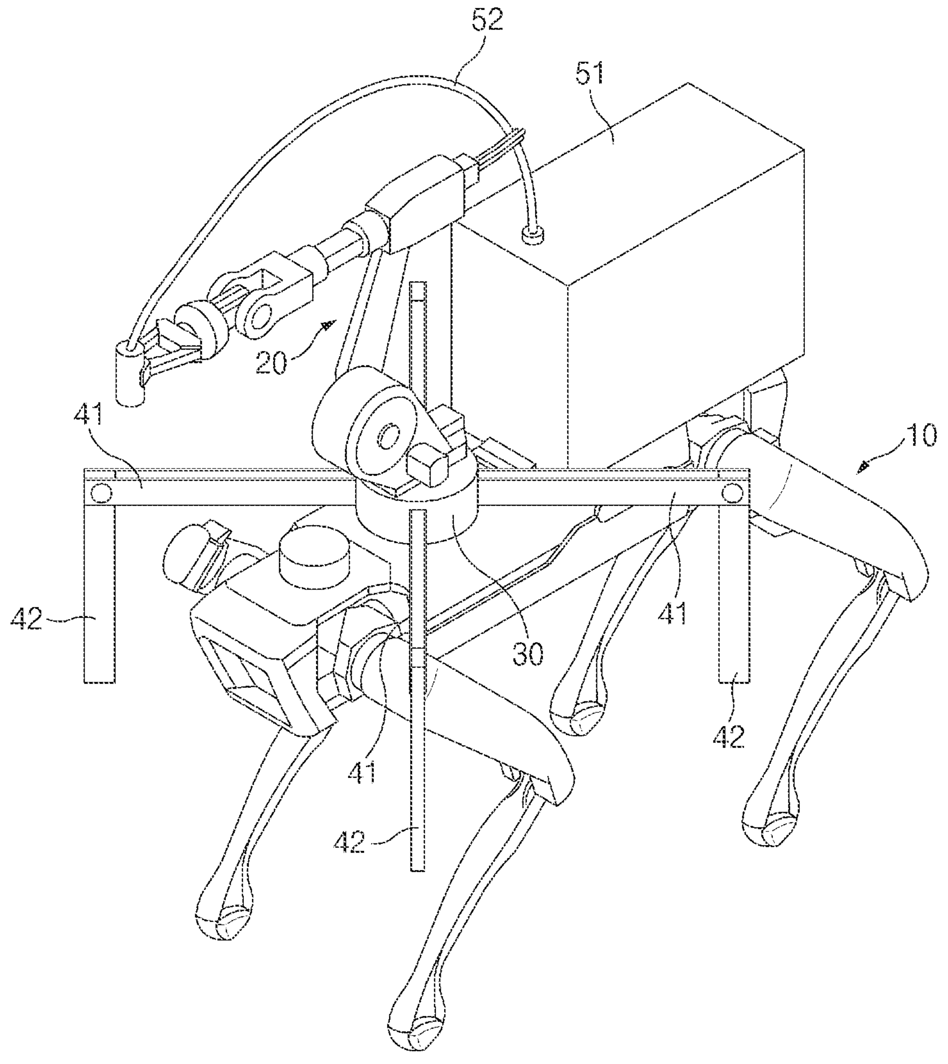
FIG. 7 is a view illustrating a state in which the rotation area of FIG. 6 is rotated toward a lower side.
Figure 8:
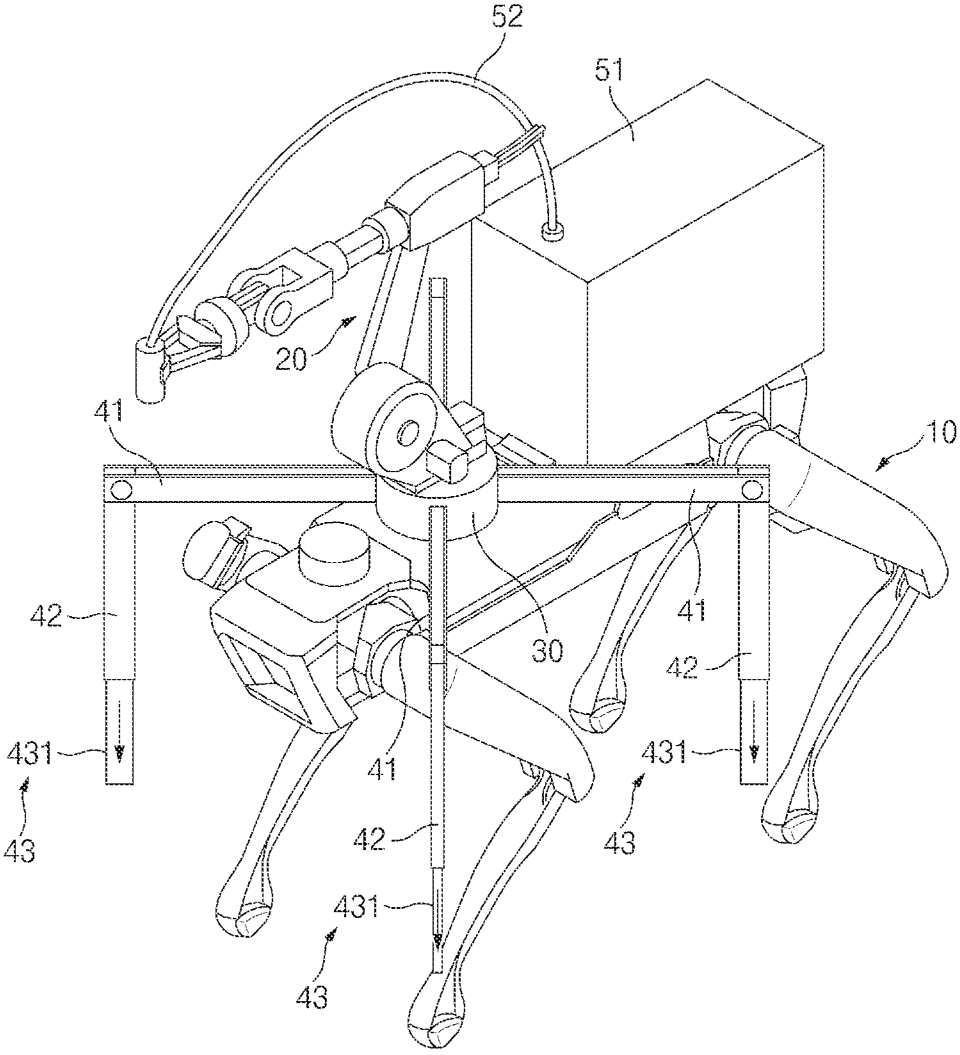
FIG. 8 is a view illustrating a state in which a telescopic area is extracted from an inside of the rotation area of FIG. 7 to the lower side.

Hereinafter, a process of bringing one end of each of the plurality of leg parts 40 into close contact with the ground will be described in detail with reference further to FIGS. 6 to 8.

Figure 6:
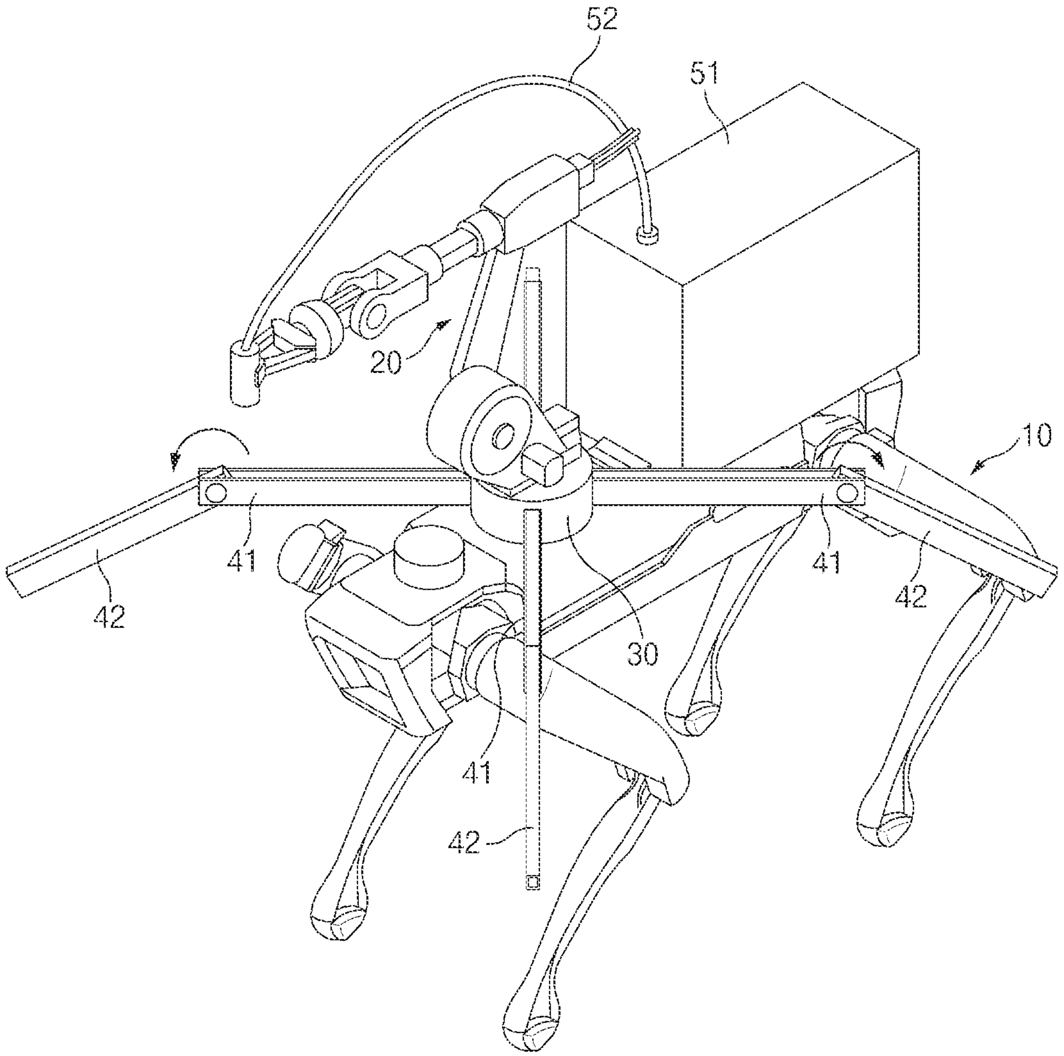
FIG. 6 is a view illustrating a state in which the rotation area of FIG. 5 is rotated.

FIG. 6 is a view illustrating a state in which the rotation area of FIG. 5 is rotated. FIG. 7 is a view illustrating a state in which the rotation area of FIG. 6 is rotated toward a lower side. FIG. 8 is a view illustrating a state in which a telescopic area is extracted from an inside of the rotation area of FIG. 7 to the lower side.

When the leg heights are calculated, the controller 70 may control the plurality of leg parts 40 so that the rotation area 42 of each of the plurality of leg parts 40 rotates to the outside. For example, a state in which the rotation area 42 rotates to the outside may be a state in which the other end of the rotation area 42 is rotated to be extracted upward from (and out of) the storage groove 41*a* (see FIGS. 4 and 5), to be oriented to one side in the horizontal direction (see FIG. 6), and then to be oriented to the lower side (see FIG. 7).

For example, each of the plurality of leg parts 40 may be provided with a power transmission part (not illustrated) for rotating the rotation area 42 with respect to the fixed area 41. The power transmission part may be an actuator that may be controlled by the controller 70. The actuator may be provided as a hydraulic (piston-cylinder) actuator and/or an electric (motor) actuator. The power transmission part may generate power for rotating the rotation area 42 as well as moving the telescopic area 43.

The controller 70 may control the power transmission part so that, when the other end of the rotation area 42 is oriented to the lower side, the first telescopic area 431 is extracted downward from the inside of the rotation area 42 (see FIG. 8) and the second telescopic area 432 is extracted downward from the inside of the first telescopic area 431 (see FIG. 1). The controller 70 may control the power transmission part so that, when a lower end of the second telescopic area 432 is seated on the ground, movement of the telescopic area 43 is stopped. In this way, when all lower ends of the second telescopic areas 432 of the plurality of leg parts 40 are seated on the ground, the printing apparatus 1 may be in a printing ready state (e.g., stationary).

When the printing apparatus 1 is in the printing ready state, the controller 70 may control the supply part 50 and the printing part 20 so that the 3D printing is progressed. The controller 70 may control the power transmission part so that the plurality of leg parts 40 are spaced apart from the ground when the 3D printing is completed or movement of the printing apparatus 1 is required while the 3D printing is performed.

The controller 70 may be mounted on or in the connection part 30. For example, the controller 70 may be installed to be embedded within the connection part 30. The controller 70 may be implemented as a processor having a function of decoding and executing commands based on input information.

According to an embodiment of the present disclosure, printing can be performed through a structure in which a printing part is coupled to a movable robot, so that a printing apparatus may be applied to various environmental conditions and may produce a large structure even in a relatively small work area.

Hereinabove, even though it has been described that all components constituting the embodiments of the present disclosure are combined into one part or are operated while combined with each other, the present disclosure is not necessarily limited to these embodiments. That is, all the components may be operated while selectively combined into one or more parts within the scopes of the present disclosure. Further, terms such as "includes", "constitutes", or "have" described above can mean that the corresponding component may be inherent unless otherwise stated, and thus can be construed as not excluding other components but may further include other components. Terms including technical or scientific terms can have a same meanings as those commonly understood by those skilled in the art to which the present disclosure pertains unless otherwise defined. The generally used terms defined in the dictionaries can be construed as having meanings that coincide with meanings of the contexts of the related technologies.

The above description is merely illustrative of the technical spirit of the present disclosure through example embodiments, and those skilled in the art to which the present disclosure belongs may make various modifications and changes without departing from the scopes of the present disclosure. Thus, the example embodiments disclosed in the present disclosure are not intended to limit the technology spirit of the present disclosure, but are intended to describe the present disclosure, and the scopes of the technical spirit of the present disclosure are not limited by these example embodiments. The scopes of protection of the present disclosure can be interpreted by the appended claims, and all technical spirits within scopes equivalent thereto can be interpreted as being included in the scopes of the present disclosure.

What is claimed is:

1. A printing apparatus comprising:

a movable robot configured to be movable on a ground through movement of robot legs;

a printing part coupled to the movable robot and configured to perform three-dimensional (3D) printing;

a plurality of leg parts configured to fix a position of the movable robot with respect to the ground, the leg parts being separate from the robot legs; and a connection part interposed between the movable robot and the printing part, wherein the printing part is coupled to the movable robot via the connection part, wherein the plurality of leg parts are configured to be movable such that a first leg end thereof can approach the ground to fix a position of the movable robot with respect to the ground or move away from the ground when the movable robot is being moved by the robot legs;

wherein each of the plurality of leg parts includes a fixed area having a shape of which a first fixed area end is fixed to the connection part and a second fixed area end protrudes from the connection part in a horizontal direction; and wherein each of the plurality of leg parts further includes a rotation area of which a first rotation area end is rotatably coupled to the second fixed area end of the fixed area, wherein the fixed area has a storage groove extending along the horizontal direction and recessed downward into the fixed area from a top surface of the fixed area such that the rotation area can be accommodated in the storage groove, and wherein the rotation area is configured to be accommodated in the storage groove and rotate relative to the second fixed area end of the fixed area.

2. The apparatus of claim 1, wherein the plurality of leg parts are mounted on the connection part such that the leg parts are spaced apart from each other in a circumferential direction of the connection part.

3. The apparatus of claim 1, wherein each of the plurality of leg parts further includes a telescopic area telescopically coupled to the rotation area and configured so that the telescopic area can be accommodated inside the rotation area or extracted from inside of the rotation area in an extension direction that is a direction in which the rotation area extends.

4. The apparatus of claim 3, wherein the telescopic area includes:

a first telescopic area configured to be movable in the extension direction with respect to the rotation area such that the first telescopic area can be accommodated inside the rotation area or extracted from inside of the rotation area; and a second telescopic area configured to be movable in the extension direction with respect to the first telescopic area such that the second telescopic area can be accommodated inside the first telescopic area or extracted from inside of the first telescopic area.

5. The apparatus of claim 1, wherein the second fixed area end of the fixed area is spaced apart from the first fixed area end in the horizontal direction with respect to the movable robot.

6. The apparatus of claim 1, wherein the plurality of leg parts include:

a first leg part mounted on a first side of a peripheral surface of the connection part and protruding from the connection part in a first horizontal direction, wherein the first leg part includes a first fixed area extending in the first horizontal direction, and wherein the first fixed area has a first distal end spaced apart from the connection part; and a second leg part mounted on a second side of the peripheral surface of the connection part and protruding from the connection part in a second horizontal direction, wherein the second horizontal direction is opposite to the first horizontal direction, wherein the second leg part includes a second fixed area extending in the second horizontal direction, wherein the second fixed area has a second distal end spaced apart from the connection part, and wherein the movable robot is between the first distal end and the second distal end.

7. The apparatus of claim 6, wherein the plurality of leg parts further include:

a third leg part mounted on a third side of the peripheral surface of the connection part and protruding from the connection part in a third horizontal direction, wherein the third leg part includes a third fixed area extending in the third horizontal direction, and wherein the third fixed area has a third distal end spaced apart from the connection part; and a fourth leg part mounted on a fourth side of the peripheral surface of the connection part and protruding from the connection part in a fourth horizontal direction, wherein the fourth horizontal direction is opposite to the third horizontal direction, wherein the fourth leg part includes a fourth fixed area extending in the fourth horizontal direction, wherein the fourth fixed area has a fourth distal end spaced apart from the connection part, and wherein the movable robot is between the third distal end and the fourth distal end.

8. The apparatus of claim 7, wherein the first horizontal direction and the second horizontal direction intersect the third horizontal direction and the fourth horizontal direction.

9. The apparatus of claim 1, further comprising a supply part mounted on a rear side of an upper portion of the movable robot, the supply part being configured to supply a material to the printing part, wherein the printing part includes:

a multi-joint robot mounted on a front side of the upper portion of the movable robot; and a discharge member coupled to the multi-joint robot such that the multi-joint robot is configured to move the discharge member to a target position, and wherein the discharge member is fluidly coupled to the supply part and the discharge member is configured to discharge the material from the supply part.

10. The apparatus of claim 9, wherein the multi-joint robot includes a plurality of links forming different rotation axes and being rotatable with respect to each other, and wherein the plurality of links includes a telescopic link having a telescopic rotation axis and of which a length in a telescopic link motion direction in which the telescopic rotation axis extends can increase or decrease.

11. The apparatus of claim 9, wherein the supply part includes:

a storage member configured to store the material; and a hose member inserted into the storage member, wherein the discharge member is fluidly coupled to the storage member via the hose member.

12. The apparatus of claim 1, further comprising:

an information acquisition part mounted on the movable robot and configured to acquire terrain information around the printing apparatus; and a controller electrically connected to at least one of or any combination of the movable robot, the printing part, and the plurality of leg parts, and wherein the controller is configured to:

calculate leg heights of the plurality of leg parts with respect to the ground, based on the terrain information; and control the plurality of leg parts such that the plurality of leg parts are extended to the ground based on the calculated leg heights in response to the movable robot being at a target point for the printing part to perform the 3D printing.

13. The apparatus of claim 12, wherein the information acquisition part includes a light detection and ranging (LiDAR) sensor.

14. A printing apparatus comprising:

a movable robot configured to be mobile and movable on a ground;

a printing part mounted on the movable robot and configured to perform three-dimensional (3D) printing; and positioning leg parts extending from the movable robot, wherein the positioning leg parts are configured to fix a position of the movable robot with respect to the ground, wherein the positioning leg parts are movable for extracting towards the ground in response to the movable robot being located at a target point for performing the 3D printing, wherein each of the positioning leg parts comprises:

a fixed leg part having a storage groove therein;

a rotation leg part rotatably coupled to a fixed leg distal end of the fixed leg part, wherein the storage groove is configured to receive the rotation leg part therein; and a telescopic leg part telescopically coupled to a rotation leg distal end of the rotation leg part, wherein the rotation leg part is configured to receive the telescopic leg part therein, wherein the movable robot is interposed between the telescopic leg parts and the rotation leg parts when the positioning leg parts are configured to fix the position of the movable robot with respect to the ground, and wherein the positioning leg parts provide clearance for movement of mobility parts of the movable robot when the telescopic leg parts are in the rotation leg parts and the rotation leg parts are in the storage grooves of the fixed leg parts.

15. The apparatus of claim 14, wherein the printing part comprises:

a printing material storage part mounted on the movable robot;

a multi-joint robot mounted on the movable robot having at least three degrees of movement; and a discharge member fixed to a distal end of the multi-joint robot, wherein the multi-joint robot is configured to move the discharge member to selected positions for performing the 3D printing, wherein the discharge member is fluidly coupled to the printing material storage part for receiving printing material therefrom.

16. The apparatus of claim 14, further comprising:

an information acquisition part mounted on the movable robot, wherein the information acquisition part includes a light detection and ranging (LiDAR) sensor; and a controller electrically coupled to at least one of or any combination of the information acquisition part, the movable robot, the printing part, and the positioning leg parts.

17. A printing apparatus comprising:

a movable robot configured to be movable on a ground;

a printing part coupled to the movable robot and configured to perform three-dimensional (3D) printing;

a plurality of leg parts configured to fix a position of the movable robot with respect to the ground, wherein the plurality of leg parts are configured to be movable such that a first leg end thereof can approach the ground or move away from the ground;

a connection part interposed between the movable robot and the printing part, wherein the printing part is coupled to the movable robot via the connection part, wherein the plurality of leg parts are mounted on the connection part such that the leg parts are spaced apart from each other in a circumferential direction of the connection part;

wherein each of the plurality of leg parts includes a fixed area having a shape of which a first fixed area end is fixed to the connection part and a second fixed area end protrudes from the connection part in a horizontal direction;

wherein each of the plurality of leg parts further includes a rotation area of which a first rotation area end is rotatably coupled to the second fixed area end of the fixed area;

wherein each of the plurality of leg parts further includes a telescopic area telescopically coupled to the rotation area and configured so that the telescopic area can be accommodated inside the rotation area or extracted from inside of the rotation area in an extension direction that is a direction in which the rotation area extends;

wherein the telescopic area includes a first telescopic area configured to be movable in the extension direction with respect to the rotation area such that the first telescopic area can be accommodated inside the rotation area or extracted from inside of the rotation area; and wherein the telescopic area further includes a second telescopic area configured to be movable in the extension direction with respect to the first telescopic area such that the second telescopic area can be accommodated inside the first telescopic area or extracted from inside of the first telescopic area.

18. The apparatus of claim 17, wherein the second fixed area end of the fixed area is spaced apart from the first fixed area end in the horizontal direction with respect to the movable robot.

19. The apparatus of claim 17, further comprising a supply part mounted on a rear side of an upper portion of the movable robot, the supply part being configured to supply a material to the printing part, wherein the printing part includes:

a multi-joint robot mounted on a front side of the upper portion of the movable robot; and a discharge member coupled to the multi-joint robot such that the multi-joint robot is configured to move the discharge member to a target position, and wherein the discharge member is fluidly coupled to the supply part and the discharge member is configured to discharge the material from the supply part.

20. The apparatus of claim 17, further comprising:

a light detection and ranging (LiDAR) sensor mounted on the movable robot and configured to acquire terrain information around the printing apparatus; and a controller electrically connected to at least one of or any combination of the movable robot, the printing part, and the plurality of leg parts, and wherein the controller is configured to:

calculate leg heights of the plurality of leg parts with respect to the ground, based on the terrain information; and control the plurality of leg parts such that the plurality of leg parts are extended to the ground based on the calculated leg heights in response to the movable robot being at a target point for the printing part to perform the 3D printing.

* * * * *